Nov. 1, 1966  M. D. PRINCE  3,283,070
ELECTRICAL APPARATUS AND METHOD FOR SCENE ENHANCEMENT
Filed April 8, 1963
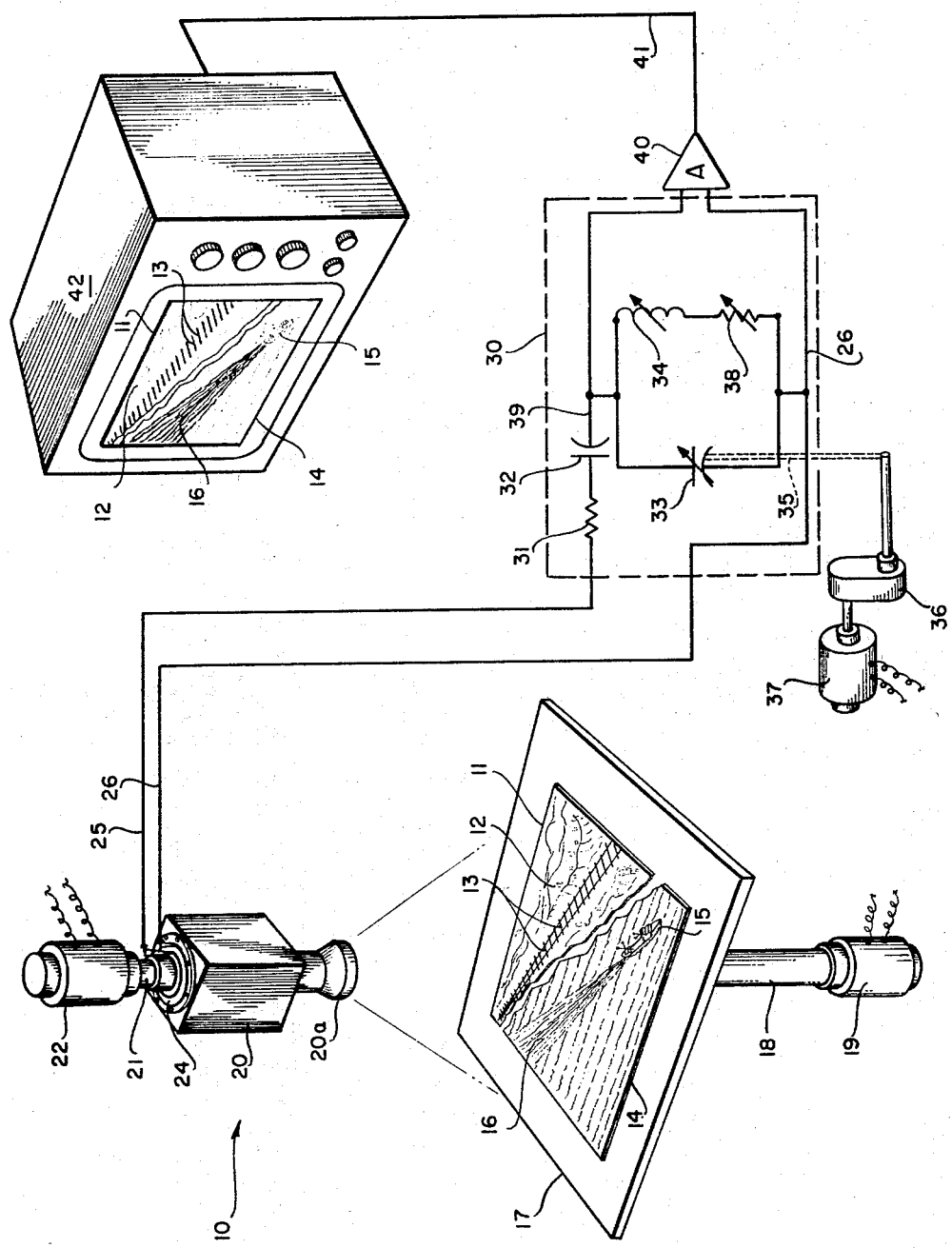
INVENTOR.
MORRIS D. PRINCE
BY
George C. Sullivan
Agent

United States Patent Office 3,283,070
Patented Nov. 1, 1966

3,283,070
ELECTRICAL APPARATUS AND METHOD FOR SCENE ENHANCEMENT
Morris D. Prince, Atlanta, Ga., assignor to Lockheed Aircraft Corporation, Los Angeles, Calif.
Filed Apr. 8, 1963, Ser. No. 271,330
7 Claims. (Cl. 178—6.8)

This invention relates to method and apparatus for scene enchancement, and more particularly to method and apparatus for enchancing periodic structure in a scene.

Presently, the detection of periodic structure is a scene such as railroad ties or the wake of a vessel, for example, is accomplished by the visual inspection of the ground from aircraft or the study of photographs of the ground at a later date. The detection of periodic structure by these methods is a tedious and fatiguing process, particularly when the periodic structure being sought is obscured because of its being viewed from a great altitude or because of interference by other features in the vicinity. To eliminate the disadvantages and limitations of such prior art devices, this invention provides method and apparatus for enhancing selected structure in a scene to facilitate its detection.

Accordingly, it is an object of this invention to provide a method and apparatus for enhancing selected structure in a scene.

Another object of this invention is to provide method and apparatus for enhancing selected structure in a scene while attenuating other and different structure in the scene.

Still another object of this invention is to provide method and apparatus for enhancing selected structure in a scene so as to make the selected structure blink.

A further object of this invention is to provide method and apparatus for assuring scanning of a scene in an appropriate direction to assure enhancing selected structure therein.

Further objects and advantages of this invention will become apparent from the following description taken in connection with the accompanying drawing which is a partially schematic view of an image enhancement embodiment of this invention.

Generally stated, this invention comprises a method and apparatus for enhancing selected preferably periodic structure in a scene. For purposes of defininition, a periodic structure in a scene is understood to mean an object consisting of a plurality of elements of generally similar appearance, said elements having approximately uniform spacing in at least one direction in the scene. Examples of periodic structures include: a railroad track, with railroad ties comprising the equally spaced elements; an organe grove, with orange trees comprising the equally spaced elements; the surf of the ocean near the shore, with the waves or breakers comprising the equally spaced elements; and the wake of a vessel. The enhancing apparatus preferably takes the form of a scanner for viewing the scene and producing an electrical signal representative of the scene, a filter for enhancing selected periodic structure in the scene, and a monitor for depicting the enhanced scene. For assuring enhancement of selected structure in the scene, provisions are made for effecting relative rotational movement between the scene and scanner.

More particularly, there is shown in the drawing the apparatus 10 for enhancing selected structure in the scene displayed in one of the photographs 11 or 14, although it could as readily be a scene on the ground viewed directly from an aircraft. For exemplary purposes, the scene disclosed in the photograph 11 is a scene showing the ground 12 containing miscellaneous background structure and the railroad ties 13, while the scene in photograph 14 is of an ocean showing a ship 15 and its characteristic wake 16. Two photographs have been shown merely as examples of two types of structure capable of enhancement, not necessarily at the same time. Photographs 11 and 12 are mounted on the support platform 17 which is connected by shaft 18 and appropriate stepdown gearing to the motor 19 for continuous rotary movement or for oscillatory movement through 180 degrees by the motor.

Scene enhancement apparatus 10 includes a scanner 20 connected by the shaft 21 and appropriate stepdown gearing to the motor 22 for rotary or oscillatory movement through 180 degrees by the motor. The scanner 20 is disclosed for exemplary purposes as being a conventional television camera having a lens 20a for focusing the camera on the scene and electrical apparatus for producing an electrical signal whose amplitude is a function of the scene brighness at the point being scanned. The electrical signals formed in camera 20 are fed through a slip coupling 24, for example, and output leads 25 and 26 to the filter 30.

The band pass filter 30 includes a resistor 31 and capacitor 32 series connected between leads 25 and 39, the selectively adjustable capacitor 33 connected between leads 39 and 26, and selectively adjustable coil 34 connected in series with selectively adjustable resistor 38 between leads 39 and 26. The coil 34 and the resistor 38 are individually adjustable. The capacitor 33 is connected by linkage 35 and selectively adjustable gear box 36 to the motor 37 for continuous or oscillatory rotation of the capacitor. For connecting the filter 30 to output, the leads 39 and 26 are connected to amplifier 40 which in turn is connected by lead 41 to the monitor 42, shown for exemplary purposes as being a conventional television monitor, for display of the electrical signal formed by camera 20 and enhanced by the filter 30.

In operation, the television camera 20 is trained upon the scene in the photograph 11, for example, and forms an electrical signal, the instantaneous amplitude of which is a function of the scene brightness at the point being scanned. The amplitude of the electrical signal therefore varies as a function of variations in the scene brightness in the scanned direction. In general, miscellaneous background structure on the ground 12 will cause the electrical signal to contain a rather broad-band assortment of frequencies. On the other hand, periodic structure in the scene being scanned at a uniform rate will cause the electrical signal to contain a predominant frequency which is determined by the velocity at which the periodic structure is being scanned, the spacing of the periodic structure, and the angle at which the periodic structure is scanned. Thus, if a periodic structure such as the plurality of railroad ties 13 has a regular spacing and is scanned perpendicular to the ties in the direction of the railroad track at a rate of one tie per microsecond, the electrical signal representative thereof will then have a predominant frequency component of one megacycle.

Moreover, if the same railroad ties 13 are scanned at an angle other than the perpendicular, the predominant frequency signal representative thereof will be diminished as a function of the angle turned from the perpendicular by reason of the reduced effective rate at which the railroad ties are scanned. The electrical signal formed by this scanning process is fed from the scanner 20 through leads 25 and 26 into filter 30. The capacitor 32 is operative to pass only A.C. current. It will be noted that the capacitor 33, coil 34, and resistor 38, in combination, form a parallel resonant circuit between leads 39 and 26. The sharpness or "Q" of this resonant circuit is a function of the value of the resistor 38 in series with the self-resistances of the coil 34 and of the capacitor 33. The resistor 38 is thus operative to adjust the "Q" of the parallel resonant circuit. The resistor 31 in combination with the individually adjustable capacitor 33, coil 34, and resistor 38 forms a band pass filter which passes a preferably narrow band of frequencies having a nominal band width which depends upon the relative values of the capacitor 33, the coil 34, and the resistor 38, and having a nominal center frequency approximately determined by the resonant frequency of the capacitor 33 and coil 34 in parallel combination.

In accordance with one aspect of this invention, the filter 30 is adjusted by adjustment of one or more of the components thereof to pass a particular band or range of frequencies to enhance features having a basic frequency falling within this range. In the example given, the nominal band width of the filter could be selected to be 0.6 megacycle with a center frequency of 1.0 megacycle. In such case the filter 30 would pass frequencies falling within the range of 0.7 to 1.3 megacycles which would include the predominant frequency of the railroad ties, that of one megacycle, when scanned in the perpendicular direction and which would also include frequencies generated by scanning the railroad ties in directions which differ from the perpendicular direction by relatively large angles. This method works well when the basic frequency generated by the railroad ties falls within the pass band of the filter and the frequency components caused by the background structure fall outside the pass band of the filter so that such background is attenuated by the filter while the railroad ties are enhanced.

In other cases, however, the frequency components of the background lie close to the frequency of the railroad ties, or the frequency components of the background structure are broad-band in character and may overlap the frequency of the railroad ties. In these cases the band width of the filter is selected to be very small and the center frequency is made selectively adjustable over a suitable frequency range. Accordingly, in the example given the nominal band width of the filter could be selected to be 0.02 megacycle by selectively adjusting resistor 38 and the center frequency of the filter could be selectively variably adjusted from 0.7 to 1.3 megacycles by cyclically varying the capacitor 33 either by rotation or oscillation thereof by motor 37. Thus, when the center frequency of the filter is at 1 megacycle, the filter will pass at a high amplitude the predominant frequency caused by scanning of the railroad ties 13 in the perpendicular direction. Moreover, when the railroad ties are scanned at an angle differing from the perpendicular so as to generate a frequency of 0.9 megacycle for example, enhancement of the railroad ties is assured because the capacitor 33 is rotated by motor 37 to cause a center frequency of the filter to be varied between 0.7 and 1.3 megacycles, for example, so that the predominant frequency 0.9 megacycle of the railroad ties will be passed whenever contained within the pass band of the filter.

It will be seen, therefore, that the variation of the center frequency of the filter 30 makes possible the effective enhancement of the railroad ties even though they are scanned at an angle substantially far removed from the perpendicular direction. Furthermore, the variation of the center frequency of the filter assures that the selected periodic structure may be enhanced even through exact knowledge of the periodic structure element spacing is not available due to minor errors in the scale factor of the photograph 11, or due to inexact knowledge of the nature of the periodic structure being sought, or to other factors. In addition to insuring the desired enhancement of the railroad ties, the rotation of capacitor 33 effectively attracts the attention of the operator to the enhanced sructure. This is because the frequency signals generated by scanning the railroad ties 13 are passed at a high amplitude periodically as the capacitor 33 is rotated by motor 37, said high amplitude occuring twice during each rotation cycle of the capacitor. This is because the parallel circuit has a resonant frequency equal to that of the railroad ties of 0.9 megacycle, for example, when the capacitor is decreasing in value and again when the capacitor is increasing in value. Accordingly, the enhanced image of the railroad ties 13 displayed on the monitor 42 will be caused to blink in and out conspicuously at twice the rotation rate of the capacitor. Tests disclose that a capacitor rotation rate of 1 cycle per second produces excellent results. If prior knowledge of the direction of the railroad ties is not available, relative rotation between the scene in the photograph 11 and the scanner 20 may be introduced by means of motor 22 and/or motor 19 at the same time the capacitor is being rotated to assure scanning of the railroad ties at an angle such that the signal generated by the scanning operation will fall within the frequency range of the filter 30. Tests further disclose that a relative rotation of 180 degrees in 15 seconds produces excellent results, although a very wide tolerance is acceptable.

It will be appreciated from the foregoing that the invention resides in the scanning of a scene to form a signal which varies as a function of the scene brightness along the scanned direction, and operating upon this signal to enhance the signal within a preselected frequency range relative to other components of the signal having different frequencies in order to enhance periodic structure in the scene having a frequency falling within the selected frequency range.

While the detailed description treats the enhancement of the railroad ties 13 of photograph 11, the enhancement method applies with equal validity to the enhancement of the wake 16 in photograph 14 or other selected structure even though such structure quite possibly would have a different frequency characteristic requiring adjustment of the filter 30. Further, while the detailed description treats the observation of a photograph by a television camera, the invention applies with equal validity to the direct observation of the terrain or scene by a television camera, an infrared scanner, a laser scanner, a radar scanner, as well as any other type of scanner wherein the amplitude of the signal produced by scanning a scene varies as a function of the brightness emitted or reflected by the scene.

Furthermore, it is within the contemplation of this invention that wide substitution of equivalents may be made among the components of the system without departing from the scope of the invention. For example, the scanner 20 could take the form of a flying spot scanner in which case the monitor 42 would be a television receiver. Also, the scanner 20 could as readily be a facsimile transmitter, in which case the monitor 42 would be a facsimile receiver. In any of these cases, the band pass filter 30 could be of the L type, as shown, or it could be of the heterodyne type similar to those commonly used in spectrum analyzers or other types designed to enhance the selected structure being sought, so long as it is a band pass filter with center frequency capable of adjustment by any suitable electrical or mechanical device over a range of frequencies. Furthermore, the monitor 42 need not be limited to visual display apparatus but could utilize acoustic, tactile, or other principles of display. As to the means for effecting relative rotation between the scanner 20 and the scene, actual relative rotational motion between the scanner and the scene is not required, but instead the raster of a television scanner camera might even be electrically rotated. While certain examples of equivalencies falling within the scope of this invention have been set forth, they are disclosed for exemplary purposes only and in no way are they intended to restrict the scope of applicant's invention. It should also be pointed out that although the scene enhancement method and apparatus of this invention is particularly suited for enhancement of periodic structure, it is within the contemplation of this invention that it may be employed in the enhancement of other and different structure by suitable filter design.

While a particular embodiment of the invention has been illustrated and described, it will be obvious to those skilled in the art that various changes and modifications may be made without departing from the invention, and it is intended to cover in the appended claims all such modifications and equivalents as fall within the true spirit and scope of this invention.

What is claimed is:

1. A method of enhancing selected structure in a scene comprising the steps of:
   scanning a scene and forming a signal which varies in amplitude as a function of the scene brightness in the scanned direction;
   operating upon said signal to enhance a band of frequencies containing the predominant frequency of said selected structure;
   effecting relative angular movement between the scene and the scanning direction;
   and displaying the enhanced signal.

2. A method of enhancing selected structure in a scene comprising the steps of:
   scanning a scene for forming an electrical signal which varies in amplitude as a function of the scene brightness in the scanned direction;
   operating upon said electrical signal to cyclically enhance frequencies therein over a selected band of frequencies within which said selected structure falls;
   and displaying said enhanced signal.

3. A method of enhancing selected structure in a scene comprising the steps of:
   scanning a scene for forming an electrical signal which varies in amplitude as a function of the scene brightness in the scanned direction;
   operating upon the said electrical signal to enhance a band of frequencies about a center frequency;
   periodically varying the center frequency over a range which contains the frequency of said selected structure;
   and displaying said enhanced signal.

4. A method of enhancing selected structure in a scene comprising the steps of:
   scanning a scene for forming an electrical signal which varies in amplitude as a function of the scene brightness in the scanned direction;
   operating upon the said electrical signal to enhance a band of frequencies about a center frequency;
   periodically varying the center frequency over a range which contains the frequency of said selected structure;
   effecting relative angular movement between the scene and the scanning direction;
   and displaying said enhanced signal.

5. Scene enhancement apparatus comprising in combination:
   means for scanning a scene and producing an electrical signal which varies in amplitude as a function of the scene brightness in the scanned direction;
   means for effecting angular movement of the scanning direction with respect to said scene;
   means for operating upon said signal to enhance a selected band of frequencies about a center frequency;
   means for periodically varying said center frequency over said band of frequencies;
   and means for displaying said enhanced signal.

6. Scene enhancement apparatus comprising in combination:
   means for scanning a scene and producing an electrical signal which varies in amplitude as a function of the scene brightness in the scanned direction;
   means for effecting angular movement of the scanning direction with respect to the scene;
   means for operating upon said signal to enhance a selected band of frequencies about a center frequency; and
   means for displaying said enhanced signal.

7. Scene enhancement apparatus comprising in combination:
   means for scanning a scene and producing an electrical signal which varies in amplitude as a function of the scene brightness in the scanned direction;
   means for operating upon said signal to enhance a selected band of frequencies about a center frequency;
   means for periodically varying said center frequency over said band of frequencies; and
   means for displaying said enhanced signal.

References Cited by the Examiner

UNITED STATES PATENTS

| | | | |
|---|---|---|---|
| 3,030,442 | 4/1962 | Brandle | 178—6.8 |
| 3,069,653 | 12/1962 | Hirschfeld et al. | 340—146.3 |
| 3,069,654 | 12/1962 | Hough | 340—146.3 |
| 3,108,248 | 10/1963 | Alexander et al. | 340—15.5 |
| 3,115,545 | 12/1963 | Gebel | 178—6.8 |

DAVID G. REDINBAUGH, *Primary Examiner.*

R. L. RICHARDSON, *Assistant Examiner.*